US006580038B1

(12) United States Patent
Mooney

(10) Patent No.: US 6,580,038 B1
(45) Date of Patent: Jun. 17, 2003

(54) STATIC WEIGHING SYSTEM

(75) Inventor: Joseph C. Mooney, Lula, GA (US)

(73) Assignee: Gainco Inc., Gainesville, GA (US)

( * ) Notice: Subject to any disclaimer, the term of this patent is extended or adjusted under 35 U.S.C. 154(b) by 192 days.

(21) Appl. No.: 09/711,492

(22) Filed: Nov. 13, 2000

Related U.S. Application Data

(60) Provisional application No. 60/176,966, filed on Jan. 19, 2000.

(51) Int. Cl.[7] .............................................. G01G 19/00
(52) U.S. Cl. ........................ 177/145; 209/592; 209/596
(58) Field of Search ............................ 177/1, 116, 119, 177/122, 123, 145; 209/592, 596

(56) References Cited

U.S. PATENT DOCUMENTS

| | | | |
|---|---|---|---|
| 3,407,932 A | 10/1968 | Northoff | 209/649 |
| 3,640,384 A | 2/1972 | Del Rosso | 209/121 |
| 3,642,130 A | 2/1972 | Altenpohl | 209/121 |
| 3,687,362 A | 8/1972 | Del Rosso | 235/98 R |
| 3,735,867 A | 5/1973 | Vanderhoof et al. | 209/74 R |
| 3,791,518 A | 2/1974 | Vanderhoof | 209/74 R |
| 3,944,078 A | 3/1976 | Altenpohl | 209/73 |
| 3,955,665 A | 5/1976 | Pettis, Jr. et al. | 198/39 |
| 3,955,678 A | 5/1976 | Moyer | 209/74 M |
| 4,039,070 A | 8/1977 | Harrison | 198/370 |
| 4,062,414 A * | 12/1977 | Cook | 177/145 |
| 4,096,950 A | 6/1978 | Brook | 209/121 |
| 4,114,707 A | 9/1978 | Del Rosso | 177/145 |
| 4,122,953 A | 10/1978 | Brook | 209/551 |
| 4,143,752 A | 3/1979 | Del Rosso | 198/365 |
| 4,148,397 A | 4/1979 | Altenpohl et al. | 209/559 |
| 4,163,488 A | 8/1979 | Brook | 198/504 |
| 4,187,945 A | 2/1980 | Altenpohl et al. | 209/592 |
| 4,372,099 A | 2/1983 | Linville | 53/415 |
| 4,420,051 A | 12/1983 | Furuta et al. | 177/25.18 |
| 4,439,892 A | 4/1984 | Altenpohl | 17/52 |
| 4,440,249 A | 4/1984 | Del Rosso | 177/145 |
| 4,450,739 A | 5/1984 | Buckner et al. | 83/23 |
| 4,483,047 A | 11/1984 | Linville, Jr. | 17/45 |
| 4,488,635 A | 12/1984 | Linville | 198/504 |
| 4,549,272 A | 10/1985 | Hagan et al. | 364/478 |
| 4,564,077 A | 1/1986 | Del Rosso | 177/145 |
| 4,566,584 A | 1/1986 | Lindstrom | 198/504 |
| 4,610,361 A | 9/1986 | Elliot | 209/555 |
| 4,754,822 A | 7/1988 | Altenpohl et al. | 177/145 |
| 4,768,600 A | 9/1988 | Colvin et al. | 177/1 |
| 4,770,260 A * | 9/1988 | Brook | 177/145 |
| 4,951,763 A | 8/1990 | Zimmerman et al. | 177/164 |
| 4,958,409 A | 9/1990 | Braeger et al. | 17/24 |
| 5,004,093 A * | 4/1991 | Blezard | 177/145 |
| 5,033,065 A | 7/1991 | Keromnes et al. | 377/6 |

(List continued on next page.)

FOREIGN PATENT DOCUMENTS

EP 0 496 083 A1 7/1992

*Primary Examiner*—Randy Gibson
(74) *Attorney, Agent, or Firm*—Watts Hoffmann Fisher & Heinke

(57) ABSTRACT

A system for weighing and sorting poultry parts based upon the weight of the poultry parts is disclosed. An infeed conveyor module receives delivers poultry parts to a scale module and also produces a part position signal to a control module. The scale module diverts successive poultry parts to successive ones of a plurality of scale units where the parts are statically weighed and weight signals are transmitted to the control module. The weighed parts are successively discharged from the scale units to a sorter module where the parts are sorted according to their weights. The sorter module comprises a conveyor that carries parts away from the scale module and sweeper elements that sweep parts off of lateral edges of the conveyor into appropriate receptacles depending on the part weight. The sweeper elements can move in either direction along a loop path adjacent the conveyor as determined by the control module to sweep the parts from the conveyor.

12 Claims, 5 Drawing Sheets

U.S. PATENT DOCUMENTS

| | | |
|---|---|---|
| 5,037,351 A | 8/1991 | Van Den Nieuwelaar et al. ........ 452/179 |
| 5,072,797 A * | 12/1991 | Hughes ....................... 177/145 |
| 5,092,414 A * | 3/1992 | Blezard ...................... 177/145 |
| 5,178,227 A * | 1/1993 | Kvisgaard et al. .......... 177/145 |
| 5,184,733 A | 2/1993 | Arnarson et al. ............ 209/585 |
| 5,229,840 A | 7/1993 | Arnarson et al. ............ 356/381 |
| 5,234,098 A | 8/1993 | Pedersen .................... 198/533 |
| 5,246,118 A | 9/1993 | Mosher ........................ 177/52 |
| 5,275,272 A | 1/1994 | Ydoate ....................... 198/367 |
| 5,300,736 A | 4/1994 | Ehrhardt ..................... 177/145 |
| 5,304,745 A | 4/1994 | Rusk et al. .................... 177/50 |
| 5,569,072 A | 10/1996 | Tieleman et al. ........... 452/185 |
| 5,576,520 A | 11/1996 | Waterman et al. .......... 177/145 |
| 5,582,283 A | 12/1996 | Arnarson .................... 198/357 |
| 5,742,010 A | 4/1998 | Griffin ........................ 177/161 |
| 5,796,051 A | 8/1998 | Chiari et al. .................. 177/17 |
| 5,813,195 A * | 9/1998 | Nielsen et al. .............. 177/145 |
| 5,871,078 A | 2/1999 | Arnarson et al. ........... 198/358 |
| 5,881,889 A | 3/1999 | Poulsen ..................... 209/657 |

* cited by examiner

STATIC WEIGHING SYSTEM

This application claims the benefit of provision application Ser. No. 60/176,966 filed Jan. 19, 2000.

TECHNICAL FIELD

The present invention relates generally systems for weighing and sorting food products, and more particularly to a high speed system for weighing static poultry parts and sorting the parts based on their weights.

BACKGROUND OF THE INVENTION

Every year, the poultry industry processes millions of chickens for human consumption. Killed birds are commonly broken down into parts that are weighed, and sorted by weight. Consumers of poultry parts, such as fast food restaurant chains, purchase enormous quantities of poultry parts by number and weight. Processors are frequently required to supply a predetermined number of parts with the further requirement that each part must weigh at least a minimum amount. Payment is made on the basis of the number of parts delivered. In filling such an order, poultry parts must be weighed and sorted so that only parts that meet the weight criteria are delivered. To maximize efficiency, the weighing and sorting must be accomplished at high throughput rates. Moreover, the weighing process must be extremely accurate in order to assure that orders are properly filled without including parts that are materially heavier than the minimum weight requirement because, in effect, the additional weight of parts over the minimum weight is not reflected in the price paid. Small weight overages on individual poultry parts can adversely affect profit margins when thousands of parts are involved.

In order to assure the fastest possible processing speeds the prior art has proposed weighing techniques that rely on weighing parts as they are being conveyed to a sorting station. In some instances parts have been hung from conveyor elements that pass over load cells for determining weight. In other systems parts have been conveyed in individual carriers that move across weighing devices during transport. In still other systems, parts are deposited on a scale momentarily and then accelerated away. These systems have not been effective in yielding accurate weights at acceptably high weighing rates. The basic problem has been that when the poultry parts are moving, they may be unstable. That is, because the parts are not homogenous, elements of the parts may be shifting position relative to other elements while the part is being weighed. In prior art systems where the poultry parts have been allowed to come to rest before weighing, the weighing rates have been unacceptably low.

Prior art systems for sorting poultry parts have been constructed using conveyors that move weighed poultry parts along a path of travel past a series of receptacles lined up along one side of the conveyor. Sorting arms are pivoted along the conveyor side adjacent each receptacle so that the arm can be moved to extend at an angle across the conveyor from the receptacle. When a poultry part having the appropriate weight for accumulation in a given receptacle is moving down the conveyor, the arm associated with the given receptacle remains extended across the conveyor so the poultry part in question moves into contact with the arm and is guided into the receptacle. Other arms, associated with other receptacles are retracted so the poultry part may pass them by. These systems were effective to sort poultry parts but the conveyors that were required tended to be relatively lengthy if more than just a few weight ranges of poultry parts were being sorted. Thus these prior art sorters required appreciable floor space and the sorting process speed was reduced in relation to the increase conveyor length.

The present invention provides a new and improved system for weighing and sorting poultry parts that permits the parts to be statically weighed while maintaining high conveying speeds through the system, and wherein poultry parts can be sorted at high rates on conveyors that have minimum lengths.

SUMMARY OF THE INVENTION

The present invention provides a static weighing system for weighing and sorting poultry parts comprising a scale module for receiving poultry parts from an infeed conveyor and statically weighing them. The scale module comprises a plurality of scale units for weighing poultry parts received from the infeed conveyor, and a plurality of poultry part diverters for directing each poultry part received from the infeed conveyor to an individual scale unit. The scale units weigh the poultry parts after the poultry parts have come to rest and discharge the poultry parts to another conveyor so that the parts are statically weighed but the rate of poultry part movement through the system is not slowed by the weighing procedure.

According to another feature of the invention a sorter unit is provided that comprises an article conveyor for carrying articles along a travel path, first and second article receptacles respectively positioned on opposite sides of the travel path along a line that extends transverse to the path, at least first and second article sweeper elements for sweeping poultry parts off either side of the conveyor into one of the receptacles, a sweeper element carrier for moving the sweeper elements adjacent the article conveyor along the line and in a loop path, and a carrier drive unit for operating the carrier to shift either article sweeper element from one conveyor edge to the opposite conveyor edge along the line so that an article on the conveyor is swept into one of the article receptacles.

Other objects, features, and advantages of the present invention will become apparent upon reading the following specification, when taken in conjunction with the drawing and the appended claims.

DETAILED DESCRIPTION OF THE DISCLOSED EMBODIMENT

Figure 1:
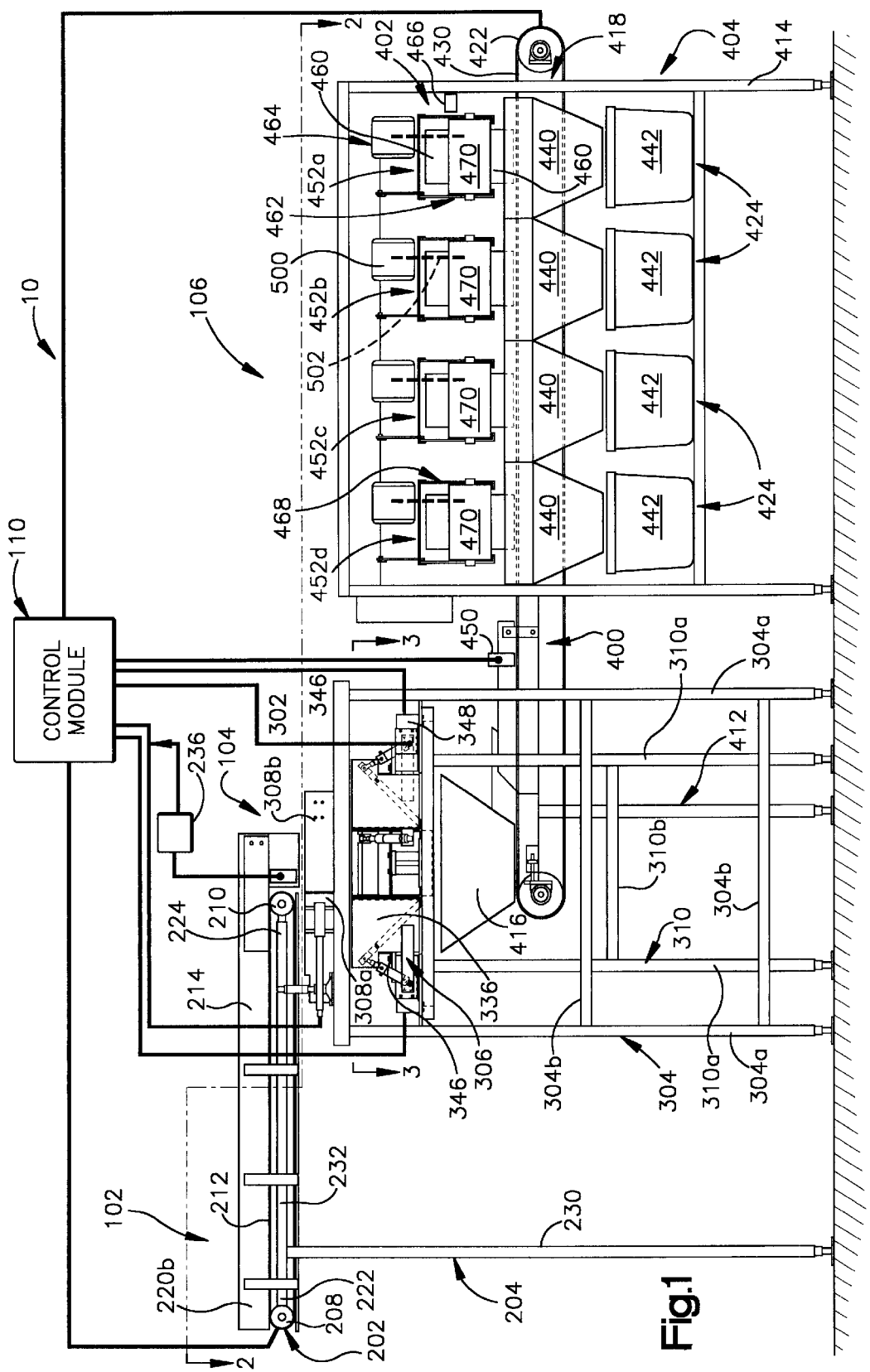
FIG. 1 is an elevational view of a weighing and sorting system embodying the present invention.

The invention is embodied in a static weighing system for weighing and sorting poultry parts. Referring now to the drawings, in which like numerals indicate like elements throughout the several views, the static weighing system 100 includes an infeed conveyor module 102, a scale module 104, a discharge sorter module 106, and a control module 110. See FIGS. 1 and 2. The infeed conveyor module 102 is configured for receiving poultry parts and for conveying the poultry parts to the scale module 104. The infeed conveyor module 102 is further configured for monitoring the position of poultry parts leaving the module 102, and sending a signal with position data to the control module 110. When the poultry parts are received by the scale module 104, the scale module 104 weighs each poultry part and sends weight data to the control module 110. The scale module 104 delivers poultry parts to the discharge sorter module 106. The discharge sorter module 106 monitors the position of poultry parts received from the scale module 104 and uses weight data received from the control module 110 to coordinate the sorting of poultry parts received from the scale module 104. Although the system 100 is disclosed as used for weighing and sorting poultry parts, other items may be weighed and sorted.

The infeed conveyor module 102 includes a conveyor unit 202, and a frame 204 configured to support the conveyor unit 202 above the ground 206 or floor.

The conveyor unit 202 is illustrated as a belt conveyor configured for delivering poultry parts to the weighing system. The conveyor unit 202 includes a drive pulley 208, a take-up pulley 210, a belt 212, a motor (not shown), and a housing 214. The conveyor unit 202 is positioned substantially horizontal to the ground 206 so that the drive pulley end 208, or discharge end, is oriented to oppose the take-up pulley end or input end along a horizontal axis of the infeed conveyor module 102. The belt 212 is disposed between the drive pulley end 208 and the take-up pulley end 210 so that the belt 212 extends between the pulleys 208, 210.

A motor 216, shown schematically, turns the drive pulley 208 at an adjustable rate of speed. The belt 212 moves with the rotation of the drive pulley 208, and in turn rotates the take-up pulley 210. Items, such as poultry parts, placed on the take-up pulley end, or input end, of the belt 212 are conveyed towards the drive pulley, or discharge end of the belt 212. The motor may be of any suitable or conventional construction.

The conveyor unit housing 214 supports the drive pulley 208 and the take-up pulley 210 in relatively spaced apart positions with the belt 212 reaved around them. The illustrated housing includes opposite sidewalls 220*a*, 220*b* and spaced apart pulley mounts 222, 224. The sidewalls project above the level of the belt 212 to preclude the possibility that poultry parts might fall from the conveyor unit. The pulley mounts 222 support the drive pulley 208 while the pulley mounts 224 support the take-up pulley 210.

The frame 204 supports the conveyor unit 202. The frame 204 may be of any suitable construction and therefore is illustrated schematically and not described in detail. As illustrated, the frame includes legs 230, and cross braces 232 that are formed from steel box beams, or the like, and welded together. Conventional welding procedures or suitable connecting devices are used to attach the legs 230 and the cross braces 232 together.

Poultry parts are placed onto the conveyor unit 202 by hand or by any suitable conveyor that is effective to assure that each poultry part on the conveyor 202 is spaced from the preceding and succeeding poultry parts.

A product sensor 236, schematically shown, generates a position signal in response to detecting the presence of a poultry product at the conveyor unit discharge end 208. The illustrated product sensor 236 is an optical detection device utilizing an optical circuit in conjunction with a light source. Fiber optic leads are stationed in alignment with each other on either side of the conveyor discharge end 208. The light source directs a light beam through the leads and across, and slightly above, the conveyor to complete the optical circuit. When a poultry part passes through the light beam, the optical circuit is interrupted and sensor 236 responds by generating an output signal to the control module 110. The illustrated product sensor 236 produces an electrical signal that is transmitted to the control module 110 via suitable wiring. The sensor may be of any suitable or conventional construction and therefore is schematically shown.

The illustrated sensor 236 is constructed and arranged so that poultry parts on the conveyor unit 202 cause a position signal to be generated just as each part is delivered from the conveyor discharge end 208 to the scale module 104.

The scale module 104 receives successive poultry parts from the conveyor unit 202, directs each poultry part to one of a plurality of scale units where the poultry part comes to rest, weighs each poultry part in a static condition, and delivers successive, weighed poultry parts to the discharge sorter 106. The rate at which poultry parts pass from the scale module is the same as the rate at which poultry parts are introduced into it even though the parts are static while being weighed. The illustrated scale module 104 comprises a diverter platform 302, a frame 304 supporting the platform, diverter units 308, scale units 306, and a frame 310 for supporting the scale units independently from the platform 302. In the illustrated embodiment of the invention four scale units 306*a–d* are employed for weighing poultry parts that are directed into them by two divereter units 308*a–b*. Use of four scale units has been found to provide adequate time for assuring that the poultry parts have come to rest before being weighed while maintaining a high through-put of poultry parts. For example, in the illustrated embodiment, each of the four scale units is capable of weighing 50 parts per minute. Thus, the illustrated scale module 104 can process 200 parts per minute and is four times faster than a module that has a single scale unit. Although four scale units have been disclosed, alternative numbers of scale units may be employed.

Figure 2:
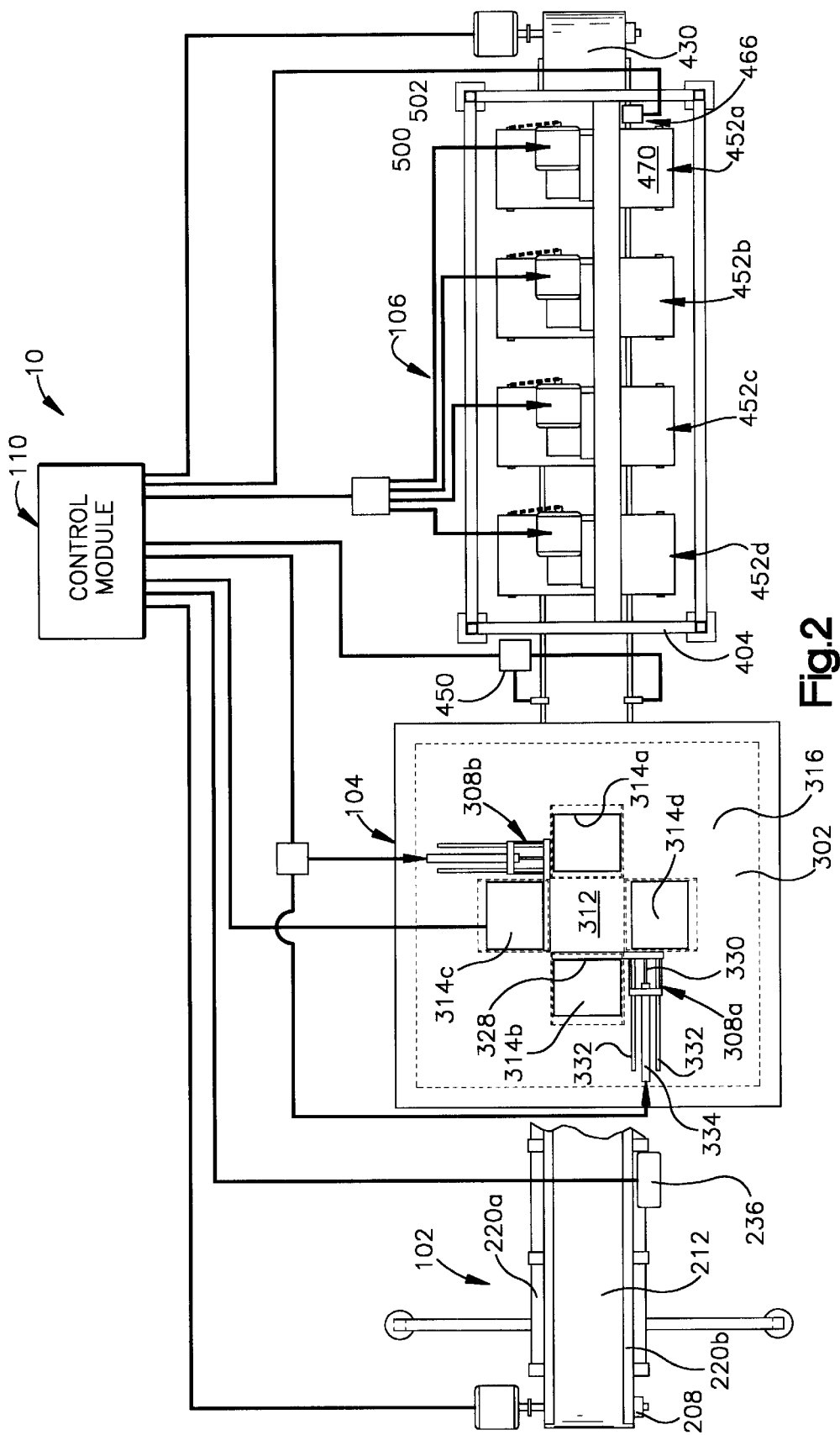
FIG. 2 is a view seen approximately from the plane indicated by the line 2—2 of FIG. 1.

As shown in FIGS. 1 and 2, the diverter platform 302 is located adjacent to and below the discharge end of the conveyor unit 202 so that successive poultry parts fall from the end of the conveyor unit 202 onto it. The illustrated diverter platform 302 is a table top-like member that defines a poultry part impact zone 312 below the conveyor discharge 208, poultry part receiving openings 314*a–d* in the platform that define edges of impact zone 312, and a surrounding marginal zone 316. The illustrated diverter platform 302 is formed by a thick, square-shaped plastic plate that is machined to produce the openings 314. But the platform may be formed of other materials and be shaped differently, if desired.

Each one of the poultry part receiving openings 314*a–d* is located vertically over and aligned with a corresponding one of the scale units 306*a–d*. When a poultry part lands on the zone 312, one of the diverter units 308 sweeps the poultry part off of the zone edge so the part falls through one of the openings 314 and into the associated scale unit. In the illustrated platform, the openings 314 are rectangular and each defines a linear impact zone edge along one of its sides. The openings are spaced apart so that if a poultry part happens to be located off-center on the impact zone it can not be swept into the wrong opening.

The diverter units 308*a–b* operate to sweep poultry parts off of the impact zone 312, through the openings 314*a–d*, and into the scale units 104. The diverter units 306a–b are mounted to the diverter platform marginal zone 316. The diverter units are identical and therefore only the diverter unit 308a is described in detail, with corresponding parts of the diverter unit 308b indicated by identical reference characters. The diverter unit 308a is illustrated as comprising a poultry part sweeper member 328, a guide mount 330, guide arms 332, and a sweeper member actuator 334. The illustrated sweeper member 328 is formed by a rectangular plate that is oriented with one long side adjacent the impact zone surface and its opposite faces extending normal to the impact zone 312. The sweeper member is reciprocated along the zone 312 so that it moves in one direction to sweep poultry parts into one opening 314a and moves in the opposite direction to sweep poultry parts into the opposite opening 314b. The long side of the plate may contact the impact zone 312, or be located immediately adjacent the zone surface, so that a poultry part on the zone surface is fully engaged by one or the other opposite face of the member 328 as it sweeps across the impact zone.

The sweeper member 328 is supported adjacent one end by the mount 330, the guide arms 332, and the actuator 334. The mount 330 is fixed to the marginal zone 316 by suitable screws. The actuator 334 is connected to the sweeper member and to the mount 330 for shifting the sweeper member back and forth across the zone 312. In the illustrated embodiment of the invention the actuator 334 is a double acting pneumatic ram and cylinder actuator with one of the ram or cylinder connected to the mount 330 and the other of the ram or cylinder attached to the sweeper member.

The guide arms 332 assist in supporting the sweeper member. Each guide arm 332 is fixedly connected to the sweeper member and is slidably received by a bushing in the mount 330 so that the arm slides back and forth through the bushing as the sweeper member reciprocates. The illustrated guide arms are connected to the sweeper member on either side of the actuator and serve to maintain the sweeper member faces parallel to the impact zone edges as the sweeper member moves along the zone surface.

The diverter units 308a, 308b are operated sequentially in response to successive position signals that are generated when poultry parts fall from the conveyor 202 onto the impact zone 312. With the diverter units 308 positioned as illustrated in FIG. 2, a first poultry part, dropping toward the impact zone 312 from the conveyor 202, creates a position signal that is transmitted to the control module 110. The control module responds by producing a diverter unit operating signal that causes the actuator 334 of the unit 308a to extend and shift the sweeper member 328 across the impact zone. The poultry part, that has now landed on the zone 312, is pushed into the opening 314a. As a second poultry part falls from the conveyor 202, a second position signal is generated and the control module responds by producing a second diverter unit operating signal that causes the actuator 334 of the unit 308a to retract. This shifts the sweeper member 328 back across the impact zone to its initial position, sweeping the second poultry part into the opening 314b. A third poultry part drops onto the impact zone 312 and the control module 110 responds to the position signal by operating the unit 308b to sweep the third part into the opening 314c. A fourth poultry part drops onto the zone 312 and is swept into the opening 314d by the unit 308b as it retracts to its initial position. This sequence is then repeated again with each poultry part delivered from the conveyor 202 causing generation of a position signal that governs which opening the part is swept into.

Figure 3:
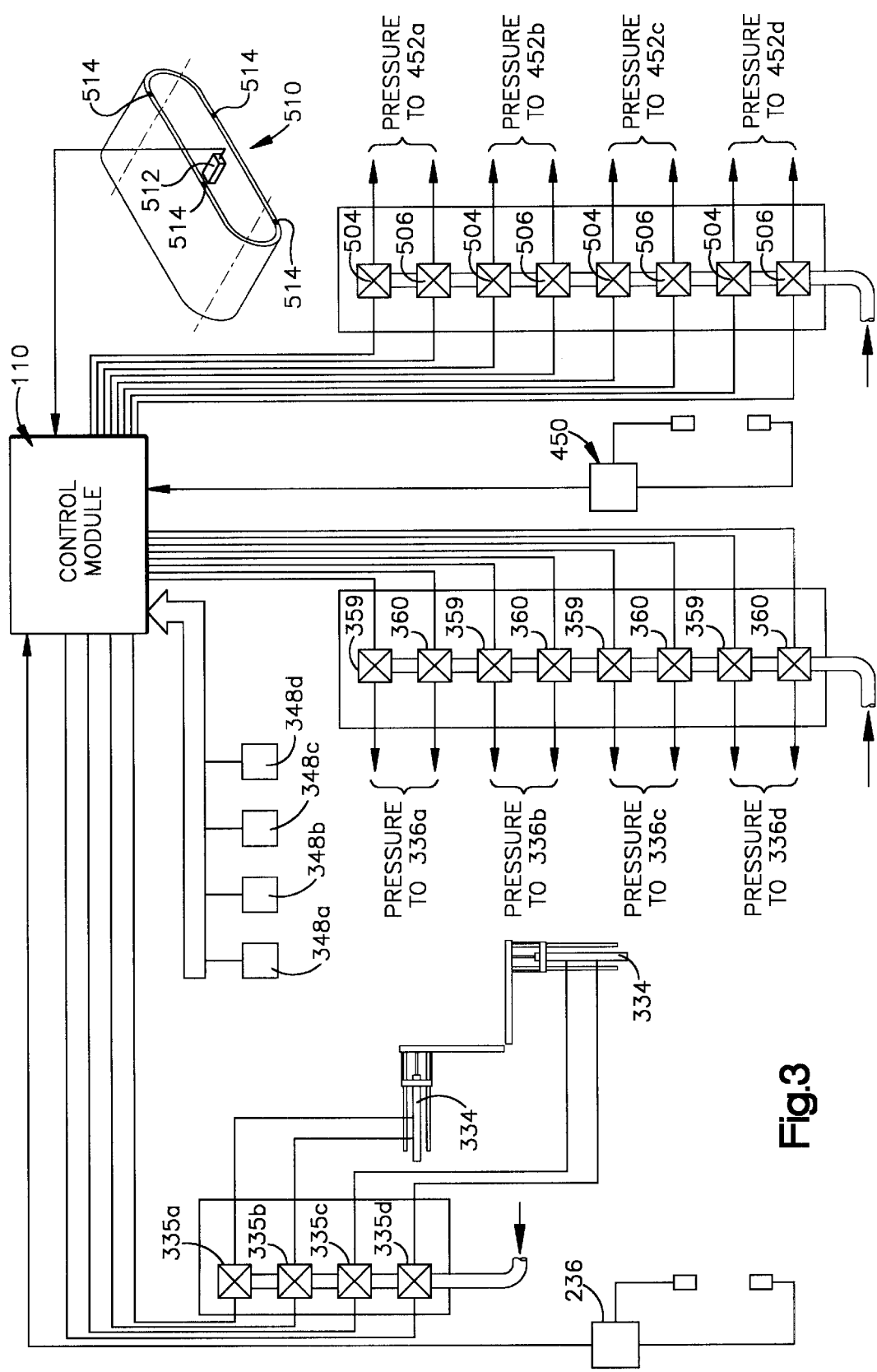
FIG. 3 is a schematic representation of part of the system of FIG. 1.

The illustrated control module 110 operates the diverter unit actuators via solenoid valves 335 that function to communicate a source of pressurized air to respective actuators. See FIG. 3. Each valve 335a–d is associated with a source pressure manifold and a conduit that extends to one end of an associated actuator 334. When a valve 335 is energized by a control module output signal, that valve communicates source pressure to the actuator. When the valve is not energized, it vents the associated actuator end to atmosphere. Control module output signals are transmitted sequentially to the valves 335a–d resulting in the actuators 334 reciprocating the sweeper members of the units 308a, 308b as described.

The illustrated frame 304 supports the platform 302 just below the discharge end of the conveyor 202 so that poultry parts land gently on the impact zone and tend to remain centered there until swept away by a sweeper member 338. The illustrated frame 304 comprises vertical support legs 304a and horizontal laterals 304b extending between the legs 304a. The legs and laterals are illustrated as formed from tubular steel structural members that are welded together, but the frame could be constructed in other ways if desired. The platform 302 is removably secured to the frame 304 by suitable bolts and nuts, not illustrated.

Successive poultry parts that are swept into respective openings 314a–d fall into respective ones of the scale units 306a–d positioned beneath the diverter platform 302, come to rest, and are weighed in a static condition. Each scale unit 306a–d is supported beneath the platform 302 by the frame 310 and comprises a scale hopper 336a–d, a mounting plate 346a–d, and a load cell 348a–d. Each load cell 348a–d is supported by a support plate 349 fixed atop the frame 310. Each mounting plate 346a–d is mounted on a respective one of the load cells 348a–d and the hoppers 336a–d are respectively attached to an associated one of the mounting plates. Accordingly, each hopper 336, and its contents, is wholly supported by a load cell 348.

The scale hoppers 336a–d are fixed to the mounting plates 346a–d in positions where they are adjacent and below a corresponding diverter platform opening 314a–d. The uppermost portions of the hoppers are adjacent the impact zone 312 so that when a diverter unit 308a–b sweeps a poultry part from the zone 312 it is quickly received by a corresponding scale hopper 336a–d.

Figure 4:
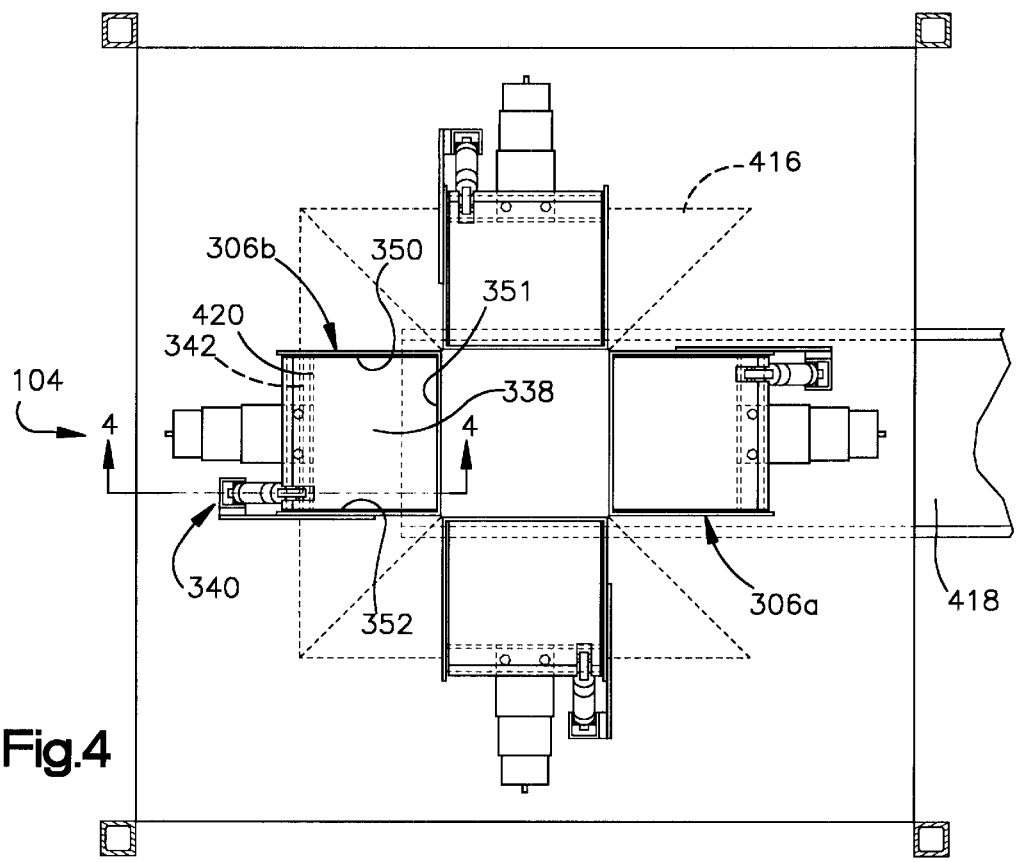
FIG. 4 is a view seen approximately from the plane indicated by the line 4—4 of FIG. 1.
Figure 5:
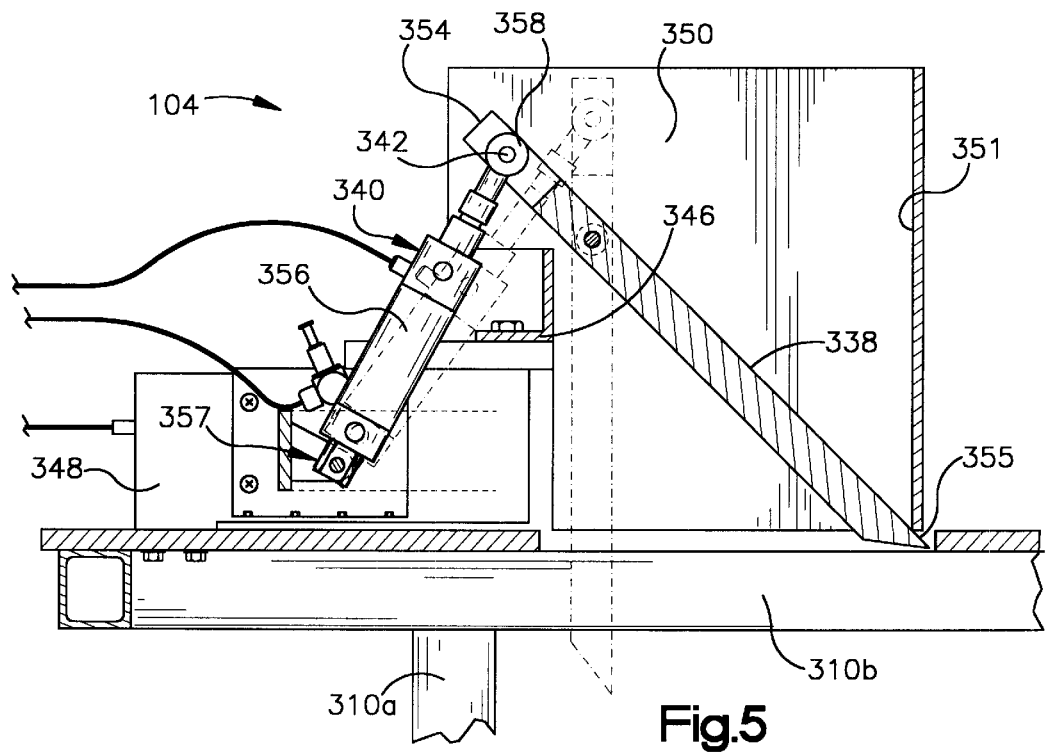
FIG. 5 is a view seen approximately from the plane indicated by the line 5—5 of FIG. 4; and, FIG. 6 is an end view of the system shown in FIG. 1.

The scale hoppers 336a–d receive the poultry parts sequentially through associated platform openings 314a–d, hold the parts for a period sufficient to assure that the parts have come to rest for weighing, and discharge the parts to the discharge module 106. The illustrated hoppers (FIGS. 1, 4, and 5) are all identical so only one is described in detail with like parts of the scale hoppers 336a–d indicated by corresponding reference characters. The hopper 336b comprises three substantially vertically extending panel-like sidewalls 350, 351, 352 below the opening 314b, a hopper door 338 that forms a fourth sidewall and a bottom wall of the scale hopper, and a door operating mechanism 340 that opens and closes the door. The hopper sidewalls 350–352 are illustrated as flat and each vertically aligned with a respective side of the platform opening 314b so that poultry parts readily pass along and between the sidewalls after falling through the opening 314b. The sidewalls guide poultry parts falling into the hopper 336b toward the bottom of hopper.

The hopper door 338 both forms a fourth sidewall and closes the hopper bottom opening so that a poultry part in the hopper rests against the door. The illustrated hopper door 338 is a flat panel-like member having opposite lateral sides that lie closely adjacent opposite hopper sidewalls 350, 352, an upper edge 354 near the bottom platform surface, and a lower edge 355 that engages the remaining hopper sidewall 351 when the door is closed so that poultry parts are securely held in the hopper. When closed, the illustrated door extends downwardly and at an angle across the hopper bottom opening. When open, the illustrated door extends vertically, parallel to the sidewalls 350–352, so that poultry parts in the hopper slide off the door and fall to the discharge sorter module 106. The door 338 is illustrated as mounted between the opposed hopper sidewalls 350, 352 by a pivot pin 342 that both supports the door and provides an axis about which the door pivots when moving between its open and closed positions.

The door operating mechanism 340 shifts the door between its open and closed positions. The illustrated mechanism 340 comprises an actuator 356 anchored to the scale hopper via a mounting plate, pillow block and bushing 357 and attached to the hopper door adjacent the upper edge 354 by a pivot connection 358. The illustrated actuator is a double acting pneumatic ram and cylinder that is operated between the door-open and door-closed positions by air pressure supplied from a pressure source.

In the illustrated embodiment of the invention the actuator 356 is alternately supplied with operating pressure via solenoid operated control valves 359, 360 (FIG. 3) that are, in turn, alternately energized by the control module 110 in response to position signals produced by poultry parts delivered from the conveyor. In the illustrated system 100, one or the other of the valves 359, 360 is always energized from the control module and when energized, that valve communicates source pressure to one end of the actuator. The valve that is not energized vents the other end of the actuator to atmosphere.

Referring again to FIG. 5, the mounting plate 346 is fixed to the scale hopper 336 and to the load cell 348 so that the entire weight of the scale unit rests on the load cell. The illustrated mounting plate 346 extends between, and is fixed to, the opposite hopper sidewalls 350, 352. The mounting plate is secured to the load cell 348 by suitable fasteners, such as screws.

The load cell may be of any conventional or suitable construction that is effective to produce an output signal whose value depends on the weight of the hopper and its contents. Accordingly, the load cell 348 is illustrated schematically and not described in detail. The load cell output signals are transmitted to the control module. In the illustrated 10 the load cells are on a loop circuit so that the control module samples signals from each load cell at predetermined, clock frequency.

The control module is programmed to determine the weight of poultry parts in a hopper by processing the load cell signals using a suitable algorithm. When poultry parts fall into the hopper, there is a tendency for the poultry parts to shift and settle for a time before they come to rest. Accordingly, the load cell produces a signal that varies until the parts come to rest and this varying signal is repeatedly sampled by the control module 110. The algorithm effectively filters the varying signals so that the static weight of the parts is accurately determined by the system 100. The control module may be constructed using any suitable or conventional hardware and software for performing the weighing routines. The weighed poultry part typically remains in the hopper until the control module 110 receives a position signal indicating that a poultry part is being delivered from the infeed conveyor and will be diverted into the hopper containing the weighed part. The control module 110 opens and recloses the hopper door so that the weighed part is discharged and the succeeding part is retained in the hopper.

The control module 110 is also programmed to dump the hoppers in the event poultry parts are present in the hoppers and have been weighed, but additional poultry parts are not delivered from the infeed conveyor. The control module 110 is programmed so that whenever the infeed conveyor fails to deliver a poultry part within a predetermined time period, the control module 110 signals the hoppers to discharge their contents. This precludes the possibility that parts remain in the hoppers for extended periods during which the system 10 may not be in active use.

The weight signal from each load cell is "zeroed" after each poultry part is discharged from the corresponding hopper. The control module samples signals from the load cells at high frequency all during operation of the system 100 so that the signal produced by the load cell after dumping a poultry part is sampled and transmitted to the control module. It is possible that a fragment of a poultry part may adhere to the hopper door, or a hopper wall, instead of being dumped when the hopper door opens. In such a case, if the load cell were not zeroed after dumping the poultry part, all the succeeding poultry part weights would be erroneous so long as the fragment remained adhered to the hopper door. Zeroing the load cell after each poultry part dump eliminates this error.

The frame 310 supports the scale modules separately from the platform 302 so that the load cells are isolated from—and do not generate spurious weight signals as a result of—vibrations created by operation of the diverter units and from the impacts of poultry parts on the platform. The illustrated frame 310 is formed by vertical legs 310a and laterals 310b that connect the legs together. The legs 310a and laterals 310b are sized and connected together so that the frame can be positioned with the load cells 348a–d respectively aligned with the openings 314a–d. In the illustrated frame 310 the legs 310a support a square or rectangular framework 363 at their upper ends where the load cells are anchored. The frame 310 is illustrated as constructed from welded steel tubing but other suitable constructions can be employed. As illustrated, the frame 310 is disposed within the frame 304.

The discharge sorter module 106 receives poultry parts that have been discharged from the scale hoppers, sorts them according to weight, and deposits the sorted poultry parts in containers referred to as "totes" or other suitable receptacles. The discharge sorter module 106 comprises a discharge conveyor unit 400 that receives poultry parts that drop from the scale modules 104, a sorter unit 402 that coacts with the conveyor unit for sorting poultry parts according to their weight, and a framework 404 supporting the conveyor and sorter units.

The framework 404 is illustrated as comprised of welded steel tubing that is illustrated as extending from the scale module 104 generally in line with the in feed conveyor 102. It should be noted that the framework 404 can be installed to extend orthogonally from the direction illustrated, or even in back under the infeed conveyor 102 if desired so that the "footprint" of the system 100 can be altered to suit the space in which it is installed. The framework is illustrated as constructed from welded steel tubes like the frames referred to above. The illustrated framework 404 has a conveyor supporting end section 412 that projects under the scale module 104 for supporting the poultry part receiving end of the conveyor and a remote section 414 for supporting the remote end of the conveyor unit 400 and the sorter unit 402.

The discharge conveyor unit 400 transports poultry parts that have been weighed and dropped from the scale module 104 along a travel path to one of a number of poultry part receptacles. The illustrated unit 400 comprises, a poultry part deflector 416 supported by the framework 404 beneath the scale module 104, a conveyor 418 supported by the framework and extending from a proximal end 420 beneath the deflector 406 to a distal end 422 spaced from the scale module, and receptacles 424 that are disposed along the sides of the conveyor 418 for receiving poultry parts that have been weighed and sorted.

The poultry parts that drop from the scale module 104 impinge on the deflector 416 and are guided onto the conveyor 418. The illustrated deflector is formed by a three sided chute structure having downwardly converging side walls that direct poultry parts onto the conveyor. The illustrated sidewalls form three sides of an inverted frustum of a pyramid with the fourth wall omitted so that parts may pass from the deflector along the conveyor travel path. The framework end section 412 supports the deflector.

The conveyor 418 is formed by a conveyor belt 430 that is reeved around around idler and drive shafts at the respective conveyor ends 420, 422, and a drive motor 432 associated with the drive shaft at the distal end 422. The belt 430 is suitably supported between its ends along its upper reach so that poultry parts conveyed along the travel path are firmly supported. The drive motor is illustrated as a variable speed motor that is operated in response to signals from the control module. The motor 432 generally operates continuously while the system 100 is operating. In the illustrated embodiment the conveyor belt 430 is formed from chain-like plastic links (not illustrated) that are commonplace in the food industry.

The sorter unit sweeps poultry parts off of the conveyor belt 430 and into one or another of the receptacles 424. The illustrated receptacles 424 comprise guide chutes 440 that are fixed to the framework 404 and totes 442, each positioned under a respective chute 440. Each chute 440 is supported by the framework immediately adjacent an edge of the conveyor so that a poultry part that is swept off the conveyor by the sorter unit 402 drops immediately into a chute 440. The illustrated chutes 440 are formed by four sidewalls that are connected together at their edges to form an open ended tube having a rectangular throat. Poultry parts that enter the chute are directed downwardly into a tote 442 that is positioned beneath the chute.

The totes 442 are bucket-like containers that are removable by system attendants when appropriately filled with poultry parts. The illustrated totes may be of any suitable or conventional construction and are schematically illustrated as supported by the framework 404, although they could, as well, be supported on the floor beneath the chutes 440.

In the illustrated system four receptacles 424 are disposed on each lateral side of the conveyor. The chutes 440 are located immediately adjacent each other so that the length of the conveyor is minimized. More or fewer receptacles can be employed, depending on the range of weights of poultry parts being sorted and upon the degree of weight discrimination that is desired. A receptacle can also be placed at the end of the conveyor for receiving parts that do not meet the weight criteria for any of the receptacles positioned along the lateral sides of the conveyor belt 430.

The sorter unit 402 sweeps poultry parts off of the conveyor into one or another of the receptacles 424 depending on the weight of the individual parts. The sorter unit 402 comprises a poultry part position detection unit 450 and a plurality of poultry part deflector units 452, each functioning independently to sweep a poultry part off one side or the other of the conveyor belt 430. The deflector units are effective to sweep poultry parts off either side of the conveyor belt 430 or permit the part to pass by them. As such, the units 452 enable the use of a conveyor belt 430 that is much shorter than would otherwise be required if the same parts were sorted using prior art pivoting poultry part deflectors. When a poultry part is discharged from a scale unit 104, the weight signal generated by the scale unit has been transmitted to, and stored by, the control module. The weight signal is paired with the position signal generated when the poultry part in question was delivered from the in-feed conveyor so that the part in question is identified by position and weight. When the part in question is delivered onto the conveyor belt 430, the position detection unit 450 detects the part and transmits a position signal to the control module 110 that precisely locates the part in question on the conveyor 430. Thus, as each poultry part proceeds along the conveyor belt 430, information corresponding to its precise weight and position is present in the control module 110. The reason why the position detection unit 450 is employed is that poultry parts do not necessarily proceed through the scale unit at a consistent rate. When the scale units discharge the parts, some parts slide off of the hopper door 338 more quickly than others do. If the original position signals from the unit 236 were relied upon, the actual position of the parts on the sorter conveyor 430 would not be precisely known.

The control module is programed so that each receptacle 424 receives only poultry parts having weights within a predetermined range. In the illustrated system 100, for example, poultry parts within 8 different weight ranges can be sorted. Parts in each weight range are delivered to a respective one of the receptacles 424. The deflector units 452 sweep the poultry parts off the conveyor into weight appropriate receptacles in response to signals from the control module. In the illustrated system 100 four deflector units 452*a–d* are provided, each operative to deliver poultry parts to a laterally aligned pair of receptacles located on opposite sides of the conveyor belt 430. The deflector units 452*a–d* are identical in construction and therefore only one is described in detail. Corresponding parts of each deflector are indicated by identical reference characters.

The deflector unit 452*a* sweeps poultry parts off of the conveyor belt 430 into the laterally aligned receptacles located closest to the distal conveyor end 422 in response to operating signals generated by the control module. The deflector unit 452*a* comprises poultry part sweeper elements 460, a sweeper element carrier 462 disposed above the conveyor belt, a carrier drive unit 464, a sweeper element position sensor 466, and a support structure 468 for anchoring the deflector unit to the framework 404.

Figure 6:
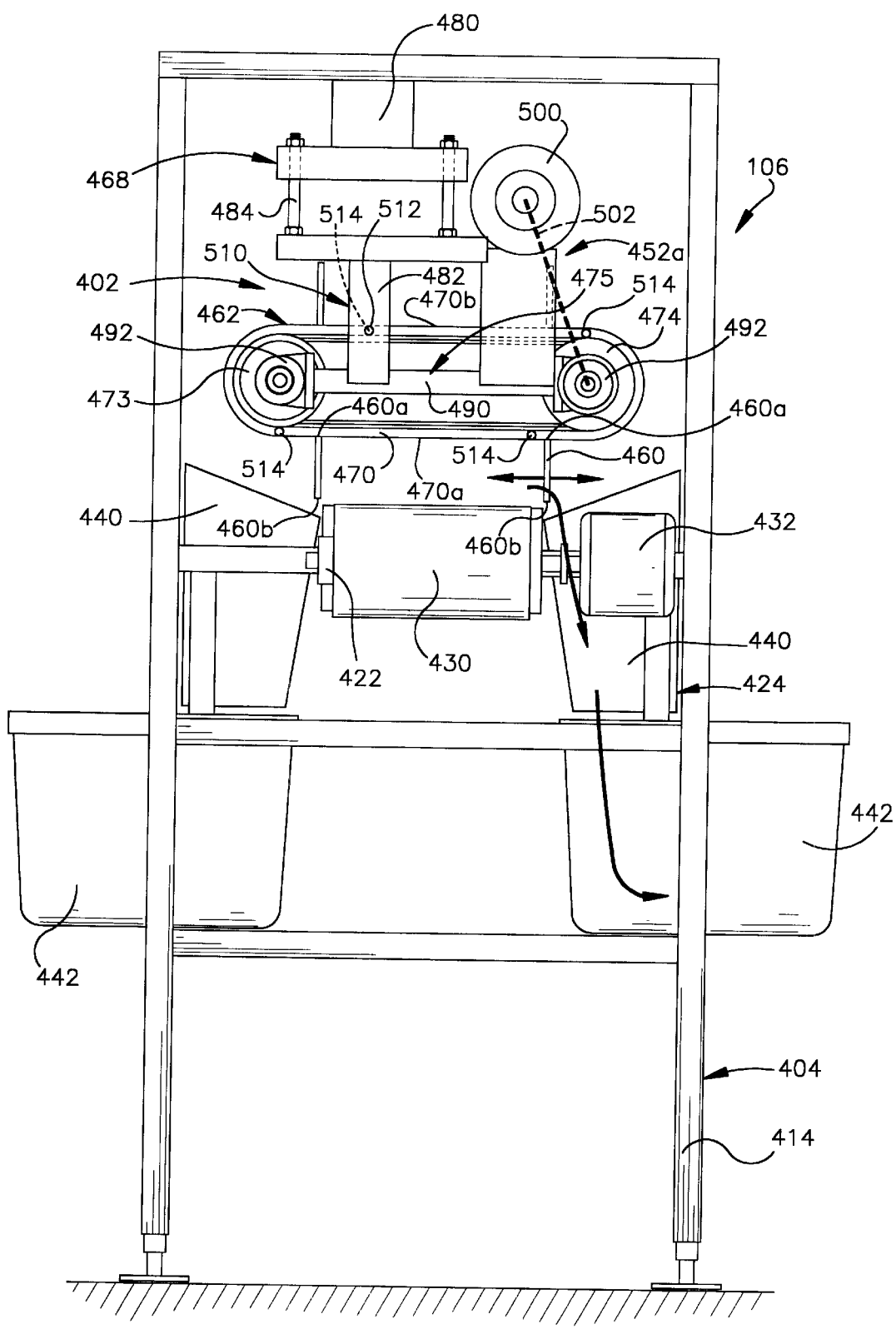

Sweeper elements of each deflector unit move along a loop path above the conveyor belt 430 for sweeping poultry parts off of the belt. In the illustrated system 100 each poultry part sweeper element 460 is formed by a rectangular plate having one long plate edge 460*a* fixed to the carrier so that the sweeper element extends in the direction of travel of the conveyor belt 430. See FIG. 6. The carrier 462 moves the sweeper elements 460 transverse to the direction of conveyor belt travel so that sweeper elements that project from the carrier toward the conveyor belt 430 engage and sweep poultry parts laterally off the belt 430. As the sweeper elements pass across the belt, the projecting long plate edge 460*b* passes closely adjacent the belt surface assuring that a poultry part on the conveyor belt is engaged by one side face of the sweeper element 460 and swept, or pushed, off the belt into a receptacle. The carrier 462 is capable of reciprocating the sweeper elements so that each element may engage and sweep poultry parts off either side of the belt 430. Although the illustrated sweeper elements are in the form of rectangular plates, other sweeper element configurations may be utilized so long as they function to reliably remove poultry parts from the conveyor belt. The sweeper elements may be connected to the carrier by any suitable or conventional fasteners (not illustrated) that strongly fix the elements in place yet permit their removal for replacement or cleaning.

The sweeper element carrier 462 is constructed so that the sweeper elements move along part of the loop path that extends along a line transversely across the conveyor belt between receptacles to sweep poultry parts from the belt. The illustrated carrier comprises an endless belt 470, pulleys 473, 474, and a conveyor bed 475 that supports the pulleys 473, 474 and belt 470 above the conveyor belt 430 with the direction of travel of the belt 470 oriented transverse, and normal, to the direction of travel of the belt 430. The illustrated conveyor belt 470 has a lower reach 470a that is adjacent the conveyor 430 and an upper reach 470b that is remote from the conveyor belt 430. Sweeper elements carried on the belt 470 project away from the belt surface at 90° so that the sweeper elements on the lower reach 470a project from the belt 470 towards the belt 430 while sweeper elements carried by the upper reach 470b project in directions away from the belt 430.

The conveyor bed 475 is suspended above the conveyor belt 430 by the support structure 468. The conveyor bed comprises a body 490 extending between the pulleys 473, 474 and bearing mounts 492 at each end of the body 490 for rotatably supporting the pulleys. The conveyor bed may be of any suitable or conventional construction and therefore is not illustrated or described in detail.

The illustrated support structure 468 is fixed to the framework 404 and comprises a support strut 480 welded to the framework 404, a bracket 482 fixed to the conveyor bed 475 and suspension studs 484 extending between the strut 480 and the bracket 482. The studs 484 have threaded ends and are attached to the strut by nuts that enable adjustment of the orientation of the conveyor bed relative to the conveyor belt 430. This permits the projecting sweeper edges 460b to be position adjusted to locations immediately adjacent the upper surface of the conveyor belt 430.

The carrier drive unit 464 is comprised of a motor 500 and a drive transmission 502 connected between the motor and the drive pulley 474. The illustrated motor 500 is a reversible pneumatic motor that is operated from a source of pressurized air via control valves 504, 506 (see FIG. 3). The valves 504, 506 are, in turn, operated in response to signals from the control module 110. The valves 504, 506 are illustrated as solenoid operated valves that communicate air under pressure from a manifold to the motor 500. When the valves 504, 506 are deenergized, the motor 500 is not supplied with any operating air pressure. When the valve 504 is energized from the control module 110 it opens to supply air pressure to the drive motor 500 and the motor drives the conveyor belt 470 in one direction. When the valve 506 is energized from the control module 110 the motor 500 drives the belt 470 in the opposite direction.

The drive transmission 502 is illustrated schematically because it may be of any suitable or conventional construction. It is contemplated that the drive transmission may be a gear drive.

The poultry part sweeper elements 460 are spaced apart along the belt 470 by a distance equal to the width of the conveyor belt 430. When an element has swept a poultry part off of the belt 430 the motor 500 is immediately stopped and the sweeper element motion is halted with one sweeper element adjacent each edge of the conveyor belt 430. The deflector unit is thus poised to sweep a succeeding poultry part off of either side of the conveyor 430, depending on its weight. In the illustrated system 100 each illustrated deflector unit 452 has four sweeper elements fixed to the conveyor belt 470.

A sweeper position controller 510 controls where the conveyor belt 470 stops the sweeper elements. In the illustrated system 100 when any two sweeper elements move into alignment with respective opposite edges of the conveyor belt 430, the controller 510 signals the control module 110 to stop the motor 500. The control module 110 immediately deenergizes the appropriate motor control valve 504 or 506, stopping the conveyor belt 470. At the same time the control module 110 is reset and ready for operating the motor 500 again. The motor 500, drive transmission 502 and the carrier 462 provide sufficient friction that the conveyor belt 470 stops immediately when the controller 510 signals the control module that the sweeper elements have moved to positions on opposite edges of the conveyor belt.

The illustrated position controller 510 comprises a detector element 512 that is attached, and fixed with respect to, the deflector unit 452 and position indicator elements 514 that are fixed to the conveyor belt 470 and spaced apart along the belt 470 by distances equal to the width of the conveyor belt 430. The illustrated detector element is supported by the bracket 482 adjacent the upper reach of the belt 470. The position indicator elements are attached to the side of the conveyor belt 470 and located along the belt so that when any two of the sweeper elements are aligned with respective opposite edges of the conveyor belt 430, one of the position indicator elements is aligned with the detector element 512. When any position indicator element moves into alignment with the detector element, the detector element signals the control module to stop the motor. In the illustrated system the position indicators and the detector are magnetically coupled when they are aligned. The magnetic coupling effect results in the position signal being generated.

While a the controller 510 is illustrated and described as operating magnetically, any suitable or conventional scheme for detecting the positioning of the sweeper elements 460 may be employed.

While a single embodiment of the invention has been illustrated and described in considerable detail, the invention is not to be considered limited to the precise construction disclosed. Various adaptations, modifications and uses of the invention may occur to those skilled in the art to which the invention relates. The intention is to cover hereby all such adaptations, modifications and uses that fall within the spirit or scope of the appended claims.

What is claimed is:

1. A static weighing system for weighing and sorting poultry parts, comprising:
   an infeed conveyor module; and,
   a scale module for receiving poultry parts from the infeed conveyor module and statically weighing them, said scale module comprising a plurality of scale units for weighing poultry parts received from said infeed conveyor, and a plurality of poultry pail diverters for directing each poultry part received from the infeed conveyor to an individual one of said scale units;
   said scale units weighing said poultry parts after the poultry parts have come to rest and discharging said poultry parts thereafter;

wherein said scale module further comprises a diverter platform located adjacent said infeed conveyor module for receiving successive poultry parts from the infeed conveyor module, said poultry part diverters directing individual poultry parts from said platform to respective scale units;

wherein first and second diverters are associated with said platform, each diverter comprising a poultry part sweeper member and a sweeper member actuator, said sweeper member actuator reciprocating said sweeper member across said platform, said sweeper member delivering a poultry part to a first scale unit when moved in a first direction and delivering a succeeding poultry part to a second scale unit when moved opposite to said first direction.

2. The static weighing system claimed in claim 1 wherein the sweeper member of each diverter comprises a plate having opposite faces and a side extending along said platform so that a poultry part on the platform is engaged by one or the other opposite face of the sweeper member as it moves across the platform.

3. The static weighing system claimed in claim 1 further comprising a control module associated with said infeed conveyor and said scale module, said infeed conveyor further comprising a sensor for producing a signal indicating that a poultry part has been delivered from said infeed conveyor to said scale module, said control module receiving said sensor signal and operating a diverter to direct the poultry part to a scale unit.

4. The static weighing system claimed in claim 3 wherein said scale unit produces a weight signal having a value that corresponds to the weight of a poultry part therein, said control module detecting said weight signal and producing a command signal causing the scale unit to discharge the poultry part.

5. The static weighing system claimed in claim 4 further comprising a discharge sorter module for sorting poultry parts discharged from said scale units, said discharge sorter module comprising a discharge conveyor unit that carries poultry parts from the scale module along a travel path, and a sorter unit that coacts with the discharge conveyor unit for sorting poultry parts according to their weight.

6. The static weighing system claimed in claim 5 wherein said sorter unit comprises first and second article receptacles respectively positioned on opposite sides of said travel path and disposed along a line extending transversely across said travel path, first and second article sweeper elements each having a first article engaging face and a second article engaging face opposite said first face, said article engaging faces extending transverse to said line, a sweeper element carrier for moving said sweeper elements along a loop path adjacent said travel path, and a carrier drive unit for effecting sweeper element motion along said loop path, said drive unit operating to move said carrier for shifting either article sweeper element from one conveyor edge to the opposite conveyor edge along said line so that a poultry part on said conveyor is swept into one of the article receptacles.

7. The static weighing system claimed in claim 6 further comprising a second poultry part sensor for producing a signal indicative of a poultry part being discharged from a scale unit to said sorter module, said control module producing a command signal for operating said drive unit to sweep said poultry part into one of said receptacles in response to the signal from said second poultry part sensor and the signal from the scale unit from which said poultry part was discharged.

8. A system for weighing poultry parts, comprising:

an infeed conveyor module comprising a conveyor for moving poultry parts along a path of travel, said conveyor having a discharge end from which poultry parts are delivered from the conveyor;

a plurality of scale units for weighing poultry parts discharged from the conveyor; and, a plurality of poultry part diverters disposed below the infeed conveyor discharge end for receiving poultry parts dropped from the conveyor and directing poultry parts received from the infeed conveyor to an individual one of said scale units, each said diverter comprising a diverter member movable between alternate positions and a diverter actuator for shifting said diverter member between said positions so that poultry parts from the conveyor are directed to alternative scale units upon actuation of said diverter member;

said scale units disposed below said diverters for receiving poultry parts dropped from said diverters, said scale units weighing said parts and discharging weighed parts.

9. The system claimed in claim 8 comprising four scale units with parts delivered from said conveyor passing along one of four paths of travel, each said path of travel extending between said diverters and a respective one of said scale units.

10. The system claimed in claim 8 wherein each scale unit is constructed and arranged to receive, weigh, and discharge a single poultry part.

11. The system claimed in claim 8 comprising first and second diverters, said first diverter directing poultry parts from said conveyor along first or second alternate paths of travel and said second diverter directing poultry parts along third or fourth alternate paths of travel.

12. The system claimed in claim 11 wherein said second diverter is operated between its alternate positions while said first diverter remains in one of its positions.

* * * * *